Feb. 2, 1965

D. P. SWARTZ ETAL 3,168,718

ELECTRIC PRESSURE TRANSDUCER

Filed Nov. 9, 1962

DAVID P. SWARTZ
NEIL L. SARASOHN
LEWIS M. DUCKOR
INVENTORS

BY

*Flehr and Swain*

ATTORNEYS

United States Patent Office 3,168,718
Patented Feb. 2, 1965

3,168,718
ELECTRIC PRESSURE TRANSDUCER
David P. Swartz, Neil L. Sarasohn, and Lewis M. Ducker, Sunnyvale, Calif., assignors to American Radiator & Standard Sanitary Corporation, New York, N.Y., a corporation of Delaware
Filed Nov. 9, 1962, Ser. No. 236,592
12 Claims. (Cl. 338—42)

This invention relates generally to transducers and more particularly to pressure transducers.

As is well know, a transducer is a device which transforms a physical change, for example, displacement or pressure into a change in an electrical circuit parameter such as resistance. One class of pressure transducers employs a diaphragm coupled to a beam to stress the beam and give rise to strain in the beam. A resistive strain gauge is mounted in intimate contact with the beam to give a change in resistance which is proportional to the strain in the beam.

Transducers employing a uniform cantilevered beam coupled to a diaphragm generally require a considerable deflection to generate measurable strain. As a result, a substantial change in fluid volume is required to give measurable readings. Furthermore, the relationship between change in pressure and change in resistance is not linear; that is, a given change in pressure at different pressure levels gives a different change in resistance.

In many applications, it is desirable to have a highly sensitive transducer in which the change in electrical circuit parameter, for example, resistance, is linear.

It is a general object of the present invention to provide an improved pressure transducer.

It is another object of the present invention to provide a transducer having good linearity.

It is a further object of the present invention to provide a pressure transducer in which relatively small changes in pressure cause measurable electrical parameter variations.

It is still another object of the present invention to provide a pressure transducer employing a restrained beam with means for concentrating the stress to localized regions of the beam.

It is another object of the present invention to provide a pressure transducer which is simple in construction and relatively inexpensive in construction.

These and other objects of the invention will become more clearly apparent from the following description taken in conjunction with the accompanying drawing.

Referring to the drawing.

Figure 1:
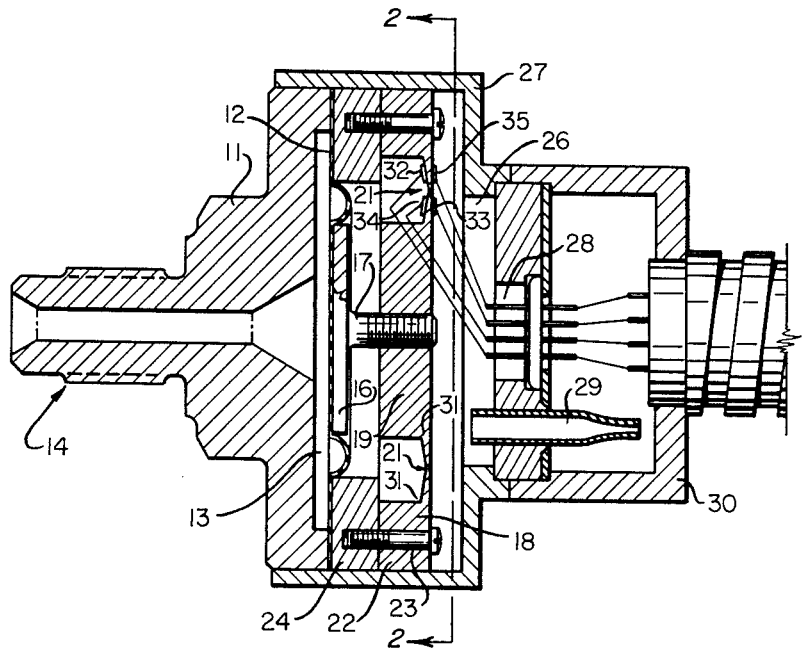
FIGURE 1 is a sectional elevational view of a transducer.
Figure 2:
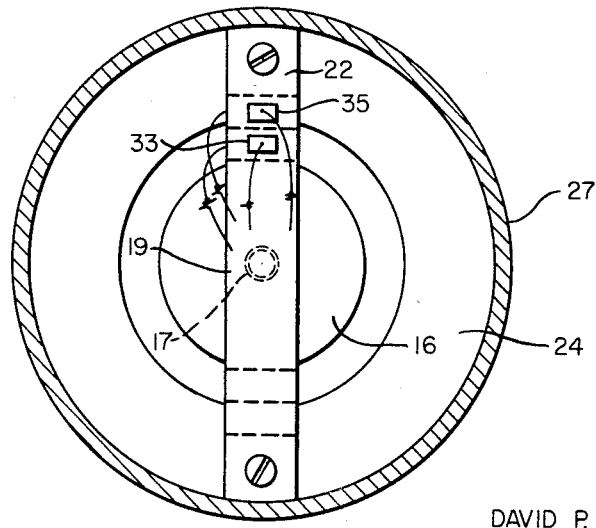
FIGURE 2 is a sectional view taken along the line 2—2 of FIGURE 1.

The transducer assembly includes a body 11. The outer edge of a flexible diaphragm 12 is suitably sealed to the body as, for example, by being welded thereto to define together with the body a pressure chamber 13. A pressure fitting 14 provides means for attaching the body to a conduit whereby the fluid whose pressure is to be measured can be directed into the chamber 13.

Preferably, the diaphragm is constructed with an annular corrugation which allows substantially linear deflection with changes in pressure. The diaphragm is highly insensitive to temperature changes since any expansion or contraction is accommodated by the corrugation and negligibly affects the spring rate.

A supporting plate or member 16 is placed in contact with the center of the diaphragm to maintain this portion of the diaphragm relatively stiff so that movement of the diaphragm takes place almost entirely at the corrugation.

A force rod 17 transmits pressure between the plate or member 16 and the beam 18. The rod may, for example, be formed integral with the plate 16 and threadably received by the beam 18.

The beam 18 preferably includes a relatively rigid center portion 19 which receives the force from the rod and which is sufficiently stiff to transmit the forces to the symmetrically disposed portions 21 of reduced cross-section. Each end 22 of the beam, beyond the sections of reduced cross-section, is rigid and may be drilled 23 to receive screws which serve to secure the ends of the beam to the support ring 24. Consequently, the beam is restrained at its ends. It is apparent that the ends of the beam may be attached in other manners as, for example, by welding or clamping to the support ring. The support ring 24, in turn, is suitably attached to the body portion as, for example, by welding.

Alternatively, the beam, support ring, diaphragm and body may be joined together by means of screws which secure the beam, ring and diaphragm to the body. A suitable seal may be formed with resilient rings sandwiched between the parts.

The pressure transducer may include a second chamber 26 formed by envelope 27 which is suitably sealed to the body portion as, for example, by welding. The envelope, together with the diaphragm, defines a second chamber 26. The envelope may be provided with a lead through header 28 for making electrical connection through the envelope to electrical components disposed within the envelope. A tubulation 30 provides means for evacuating the second chamber or for introducing a fluid under pressure into the same depending on whether it is desired to measure absolute pressure, atmospheric pressure or otherwise. An outer case 29 may be suitably connected to the envelope to receive a connector for connecting the transducer to an electrical cable.

As illustrated in FIGURE 1, the portion 21 of the beam which has a reduced cross-section is formed so that it has a variable cross-section. The portion of reduced cross-section increases in cross-section between the center and the ends 31 formed integral with the rigid center portion 19 and the rigid outer portions 22. The change in cross-section can be conveniently achieved by varying the thickness of the portion 21.

Control of the variation in cross-section of the beam provides a beam which has predetermined strain with deflection as long as the deflection is maintained below a maximum value which depends upon the material of the beam.

It is, of course, apparent that the inner rigid section may be shorter or longer as the case may be and that the essential feature is the fact that there are regions of reduced cross-sectional area which serve to concentrate the strain in the region 21 to provide a relatively large strain with minimum movement of the center portion of the beam. Furthermore, the active area of the beam can be selected so as to provide the maximum region of uniform high stress to the reception of electrical components such as strain gauges.

The shape of the active portion of the beam may be determined by deriving the strain equation for various shaped beams and then selecting the beam shape to provide a strain which varies in the predetermined manner with stress. In the preferred embodiment, the active portion was wedge-shaped as shown. This resulted in a substantially linear relationship between pressure and strain.

Electrical strain gauges may be mounted as shown at 32, 33, 34 and 35 and connected in a bridge circuit. A bridge voltage is then applied across a pair of bridge terminals and an output voltage is developed across the other pair. When the bridge is balanced, no output voltage is obtained. When the bridge is unbalanced, an output voltage proportional to the change of resistance of the strain gauges is obtained. It is seen that the strain gauges 32, 33 are under tension and the gauges 34, 35 are under compression. These gauges are connected on opposite legs for maximum output voltage for a given strain. It is apparent that there are other regions of compression and tension and the transducers might be placed accordingly. The above example merely describes one possible orientation and electrical connection of strain gauges.

We claim:

1. A pressure transducer comprising a closed chamber, a diaphragm forming a wall of said chamber, a constrained beam, means for moving said beam in response to movement of said diaphragm, means for concentrating the strain at a predetermined portion of said beam at least one strain gauge mounted directly on said predetermined portion of said constrained beam to give a change in an electrical circuit parameter indicative of the change in strain of said beam at said predetermined portion.

2. A pressure transducer comprising a closed chamber, a diaphragm forming a wall of said chamber, a constrained beam including a stiff center portion, rigidly supported stiff outer portions and symmetrically disposed portions of reduced cross-section, said portions of reduced cross-section serving to concentrate the stress therein, means for moving said beam in response to movement of said diaphragm, at least one strain gauge mounted on said beam at said portion of reduced cross-section to give a change in electrical circuit parameter indicative of the change in strain of said beam at said portion of reduced cross-section.

3. A transducer as in claim 2 wherein the cross-section of said portions of reduced cross-section progressively reduces from the outer ends towards the center.

4. A transducer as in claim 2 wherein said cross-section is progressively reduced by tapering the portions of reduced cross-section towards the center.

5. A pressure transducer comprising a closed chamber, a diaphragm forming a wall of said chamber, a constrained beam, said beam including a stiff center portion, rigidly supported stiff outer portions and symmetrically disposed portions of reduced cross-section which progressively reduce in cross-section from the outer ends towards the center, said portions of reduced cross-section serving to concentrate the stress therein, means for moving said beam in response to movement of said diaphragm, two strain gauges mounted at said portions of reduced cross-section to measure expansion, and two strain gauges mounted to measure compression.

6. A pressure transducer comprising first and second chambers separated by a diaphragm which forms a common wall for the chambers, a constrained beam disposed in said second chamber, means for moving the beam in response to movement of said diaphragm as a result of differences in pressure between the first and second chambers, at least one strain gauge mounted directly on a predetermined portion of said constrained beam to give a change in an electrical circuit parameter indicative of the change in strain at said predetermined portion.

7. A transducer as in claim 6 wherein said beam includes a stiff center portion, rigidly supported stiff outer portions and symmetrically disposed portions of reduced cross-sections, said portions of reduced cross-section serving to concentrate the stress therein, said strain gauge being mounted at said portions of reduced cross-section.

8. A transducer as in claim 7 wherein the cross-section of said portions of reduced cross-section progressively reduces from the outer ends towards the center.

9. A pressure transducer of the type in which strain gauges are mounted in cooperative relationship with a beam which is stressed in response to pressure in which said beam includes a stiff center portion, rigidly supported outer portions and symmetrically disposed portions of reduced cross-sectional area to concentrate the stresses, and said strain gauges are mounted at said portions of reduced cross-section to provide a change in electrical parameter corresponding to the stress in the beam.

10. A transducer as in claim 9 wherein the cross-section of said portions of reduced cross-section progressively reduces from the outer ends towards the center.

11. A transducer as in claim 10 wherein said cross-section is progressively reduced by tapering the portions of reduced cross-section towards the center.

12. A transducer as in claim 10 wherein two strain gauges are mounted at said portions of reduced cross-section to measure expansion and two strain gauges are mounted to measure compression.

References Cited in the file of this patent
UNITED STATES PATENTS

| | | |
|---|---|---|
| 2,885,520 | Di Giovanni | May 5, 1959 |
| 3,060,396 | Gibbs et al. | Oct. 23, 1962 |